(12) United States Patent
Wang et al.

(10) Patent No.: US 11,051,135 B2
(45) Date of Patent: Jun. 29, 2021

(54) DATA TRANSMISSION METHOD, APPARATUS, AND SYSTEM

(71) Applicant: HUAWEI TECHNOLOGIES CO., LTD., Guangdong (CN)

(72) Inventors: Xinzheng Wang, Shanghai (CN); Xingxing Hu, Shanghai (CN); Tianle Deng, Shenzhen (CN); Kaijie Zhou, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/203,577

(22) Filed: Nov. 28, 2018

(65) Prior Publication Data

US 2019/0098459 A1 Mar. 28, 2019

Related U.S. Application Data

(63) Continuation of application No. PCT/CN2016/083926, filed on May 30, 2016.

(51) Int. Cl.
H04W 4/08 (2009.01)
H04W 72/02 (2009.01)
(Continued)

(52) U.S. Cl.
CPC .............. *H04W 4/08* (2013.01); *H04W 8/005* (2013.01); *H04W 16/28* (2013.01); *H04W 72/02* (2013.01);
(Continued)

(58) Field of Classification Search
CPC ....... H04W 4/08; H04W 72/02; H04W 8/005; H04W 16/28; H04W 72/046;
(Continued)

(56) References Cited

U.S. PATENT DOCUMENTS 8,964,658 B2 2/2015 Chen et al.
9,131,502 B2 9/2015 Li et al.
(Continued)

FOREIGN PATENT DOCUMENTS

CN 101184075 A 5/2008
CN 101500312 A 8/2009
(Continued)

OTHER PUBLICATIONS

Minghai Feng et al.,"Uplink Adaptive Resource Allocation Mitigating Inter-cell Interference Fluctuation for Future Cellular Systems",This full text paper was peer reviewed at the direction of IEEE Communications Society subject matter experts for publication in the ICC 2007 proceedings,total 6 pages.

*Primary Examiner* — Peter P Chau
(74) *Attorney, Agent, or Firm* — Womble Bond Dickinson (US) LLP

(57) ABSTRACT

Embodiments of the present invention relate to communications technologies, and provide a data transmission method and an apparatus. The method includes: sending, by a base station, a grouping instruction to a target terminal, where the grouping instruction is used to group, in a preset grouping manner, terminals in a cell in which the target terminal is located into N groups, totally or partially different resources are allocated to terminals in different groups of the N groups, and a resource corresponding to an $i^{th}$ group of the N groups is used by a terminal in the $i^{th}$ group in uplink non-scheduled transmission; and receiving data that is sent by the target terminal using a target resource. In the solutions, terminals in a cell are grouped, and terminals in a same group contend for a resource allocated to the group. This mitigates resource collision when an uplink non-scheduled transmission solution is used.

16 Claims, 5 Drawing Sheets

(51) Int. Cl.
*H04W 8/00* (2009.01)
*H04W 16/28* (2009.01)
*H04W 72/04* (2009.01)
*H04W 72/08* (2009.01)
*H04W 72/12* (2009.01)
*H04W 74/08* (2009.01)

(52) U.S. Cl.
CPC ....... *H04W 72/046* (2013.01); *H04W 72/085* (2013.01); *H04W 72/121* (2013.01); *H04W 74/085* (2013.01); *H04W 74/08* (2013.01)

(58) Field of Classification Search
CPC ............. H04W 72/085; H04W 72/121; H04W 74/085; H04W 74/08
See application file for complete search history.

(56) References Cited

U.S. PATENT DOCUMENTS

| | | | |
|---|---|---|---|
| 2009/0180432 A1* | 7/2009 | Harada | H04L 1/0003 370/329 |
| 2009/0213766 A1* | 8/2009 | Chindapol | H04B 7/2621 370/278 |
| 2010/0195546 A1* | 8/2010 | Chun | H04W 72/121 370/281 |
| 2010/0246528 A1 | 9/2010 | Huang | |
| 2011/0243080 A1 | 10/2011 | Chen et al. | |
| 2011/0321050 A1 | 12/2011 | Ho | |
| 2013/0107838 A1 | 5/2013 | Li et al. | |
| 2014/0348087 A1 | 11/2014 | Wu et al. | |
| 2015/0085805 A1* | 3/2015 | Li | H04W 72/121 370/329 |
| 2015/0237649 A1 | 8/2015 | Zhang et al. | |
| 2015/0245320 A1 | 8/2015 | Chen et al. | |
| 2018/0159603 A1* | 6/2018 | Kim | H04L 27/2613 |
| 2018/0234919 A1* | 8/2018 | Tsuda | H04W 8/005 |
| 2018/0241458 A1* | 8/2018 | Jung | H04J 11/0083 |
| 2019/0007951 A1* | 1/2019 | Kwak | H04L 5/0048 |
| 2019/0028856 A1 | 1/2019 | Ho et al. | |

FOREIGN PATENT DOCUMENTS

| | | |
|---|---|---|
| CN | 102696247 A | 9/2012 |
| CN | 103220788 A | 7/2013 |
| CN | 103841603 A | 6/2014 |
| CN | 104869655 A | 8/2015 |
| WO | 2009066884 A2 | 5/2009 |

* cited by examiner

DATA TRANSMISSION METHOD, APPARATUS, AND SYSTEM

CROSS-REFERENCE TO RELATED APPLICATIONS

This application is a continuation of International Application No. PCT/CN2016/083926, filed on May 30, 2016, the disclosure of which is hereby incorporated by reference in its entirety.

TECHNICAL FIELD

The present invention relates to the field of communications technologies, and in particular, to a data transmission method, an apparatus, and a system.

BACKGROUND

With development of communications technologies, an increasing quantity of terminals need to access a wireless network, and it is difficult for the network to allocate a fixed resource to each terminal for data transmission. Therefore, the terminals share some resources for data transmission. For example, the terminals transmit data using a non-contention based uplink transmission solution. The non-contention based transmission solution is also referred to as a scheduling-based uplink transmission solution or an uplink scheduled transmission solution, and indicates that a terminal transmits data after obtaining a dedicated resource allocated by a base station. However, in such a scheme, a large amount of signalling interaction is required, overheads are relatively high, and transmission efficiency is relatively low. Against this background, a contention-based uplink transmission solution is proposed. The contention-based uplink transmission solution is also referred to as a non-scheduling based uplink transmission solution or an uplink non-scheduled transmission solution, and indicates that a terminal needs to contend with another terminal for an available resource for data transmission, instead of using a dedicated resource for data transmission.

However, in the uplink non-scheduled transmission solution, a same resource may be used by a plurality of terminals. This leads to a problem of resource collision.

SUMMARY

To mitigate a problem of resource collision that occurs when an uplink non-scheduled transmission solution is used, embodiments of the present invention provide a data transmission method, an apparatus, and a system.

According to an aspect, an embodiment of the present invention provides a data transmission method. The method includes: sending, by a base station, a grouping instruction to a target terminal, where the grouping instruction is used to group, in a preset grouping manner, terminals in a cell in which the target terminal is located into N groups, totally or partially different resources are allocated to terminals in different groups of the N groups, a resource corresponding to an $i^{th}$ group of the N groups is used by a terminal in the $i^{th}$ group in uplink non-scheduled transmission, N is an integer greater than 1, and i is a positive integer less than or equal to N; determining, by the target terminal based on the preset grouping manner, a target group to which the target terminal belongs; determining, by the target terminal, a target resource from a resource corresponding to the target group; and sending, by the target terminal, data to the base station using the target resource.

In the solution provided in an embodiment of the present invention, the terminals in the cell managed by the base station are grouped, totally or partially different resources are allocated to different groups, and terminals in a same group contend for a resource allocated to the group. This mitigates a problem of resource collision that occurs when an uplink non-scheduled transmission solution is used, thereby reducing a probability of resource collision during uplink non-scheduled transmission. Further, this mitigates a problem that a transmission delay and power consumption of the terminal increases due to resource collision.

In one embodiment, the preset grouping manner includes at least one of the following: a random grouping manner, a path-loss-based grouping manner, or a beam-based grouping manner.

In an example, the preset grouping manner includes the random grouping manner. For example, in this manner, the target terminal may randomly select a group from the N groups, as the target group.

In another example, the preset grouping manner includes the path-loss-based grouping manner. For example, in this manner, the base station may send a downlink signal to the target terminal. Correspondingly, after receiving the downlink signal sent by the base station, the target terminal may determine a signal quality range to which signal quality of the downlink signal belongs, and determine a group corresponding to the signal quality range, as the target group. For example, the terminal may determine, based on a correspondence between a signal quality range and a group, the group corresponding to the signal quality range, as the target group. The correspondence may include at least two correspondences between signal quality ranges and groups. Further, before determining the signal quality range to which the signal quality of the downlink signal belongs, the terminal may further obtain the signal quality of the downlink signal.

In another example, the preset grouping manner includes the beam-based grouping manner. For example, in this manner, the base station may transmit at least one beam in the cell in which the target terminal is located, where the at least one beam is used to transmit a discovery signal. Correspondingly, the target terminal may determine, based on a reception status of the discovery signal, the target group to which the target terminal belongs.

An embodiment of the present invention provides a plurality of grouping manners. The random grouping manner is relatively simple in implementation, and can ensure a relatively balanced quantity of terminals in each group. The path-loss-based grouping manner and the beam-based grouping manner can implement targeted control over a terminal or some terminals entering a target group, and implement more controllable and flexible grouping. In addition, the terminals may be alternatively grouped using a combination of a plurality of grouping manners, so that grouping is more refined and diversified.

In one embodiment, the base station may further send, to the target terminal, at least one of the following: a manner parameter, a grouping parameter, or a resource parameter, where the manner parameter is used to indicate the preset grouping manner, the resource parameter is used to indicate a resource corresponding to each of the N groups, and the grouping parameter includes at least one of the following cases: when the preset grouping manner includes the random grouping manner, the grouping parameter includes one or both of the following: a total quantity N of the groups or an index of each of the N groups; when the preset grouping manner includes the path-loss-based grouping manner, the grouping parameter includes one or both of the following: a signal quality measurement manner, or a signal quality range corresponding to each of the N groups; and when the preset grouping manner includes the beam-based grouping manner, the grouping parameter includes one or both of the following: a correspondence between each of the N groups and a discovery signal transmitted on a beam, or an index of a beam in use.

Some or all of the manner parameter, the grouping parameter, and the resource parameter may be obtained by the terminal in a pre-specified manner, or may be sent by the base station to the terminal. When the pre-specified manner is used, the solution in this embodiment of the present invention helps reduce an amount of data sent by the base station. When the parameters are sent by the base station, grouping control and resource allocation for the terminal are more flexible in the solution in this embodiment of the present invention.

In one embodiment, before the sending a grouping instruction to a target terminal, the base station may further determine that the terminals in the cell in which the target terminal is located need to be grouped. For example, the base station may verify, based on an uplink traffic volume of the cell and/or a resource usage status of the cell, whether the terminals in the cell need to be grouped, so that a timing for triggering the grouping meets a predetermined requirement and is more accurate, thereby more effectively reducing a probability of resource collision.

In one embodiment, the base station may further obtain at least one of the following information: an uplink traffic volume of the cell, a resource usage status of the cell, an uplink traffic volume corresponding to the $i^{th}$ group, a usage status of the resource corresponding to the $i^{th}$ group, log information reported by the terminal in the $i^{th}$ group, or a quantity of terminals in the $i^{th}$ group. Based on at least one of the information, the base station may adjust the N groups or cancel grouping of the N groups. In this manner, the base station can dynamically adjust, based on a resource usage status of each group, terminal grouping and resource allocation, so as to implement proper utilization of resources.

According to another aspect, an embodiment of the present invention provides a base station, and the base station has a function of implementing behaviors of the base station in the foregoing method examples. The function may be implemented by hardware, or may be implemented by hardware executing corresponding software. The hardware or software includes one or more modules corresponding to the foregoing function.

In one embodiment, a structure of the base station includes a processor, a transmitter, and a receiver. The processor is configured to support the base station in performing a corresponding function in the foregoing method. The transmitter and the receiver are configured to support communication between the base station and a terminal. Further, the base station may further include a memory. The memory is configured to couple to the processor, and stores a program instruction and data that are necessary for the base station.

According to still another aspect, an embodiment of the present invention provides a terminal. The terminal has a function of implementing behaviors of the terminal in the foregoing method examples. The function may be implemented by hardware, or may be implemented by hardware executing corresponding software. The hardware or software includes one or more modules corresponding to the foregoing function.

In one embodiment, the terminal includes a processor, a receiver, and a transmitter. The processor is configured to support the terminal in performing a corresponding function in the foregoing method. The receiver and the transmitter are configured to support communication between the terminal and a base station. Further, the terminal may further include a memory. The memory is configured to couple to the processor, and stores a program instruction and data that are necessary for the terminal.

According to still another aspect, an embodiment of the present invention provides a communications system. The system includes the base station and the terminal described in the foregoing aspects.

According to yet another aspect, an embodiment of the present invention provides a computer storage medium, configured to store a computer software instruction used by the foregoing base station, where the computer software instruction includes a program that is designed for executing the foregoing aspects.

According to yet another aspect, an embodiment of the present invention provides a computer storage medium, configured to store a computer software instruction used by the foregoing terminal, where the computer software instruction includes a program that is designed to execute the foregoing aspects.

Compared with previous solutions, the solutions in embodiments of the present invention, the terminals in the cell managed by the base station are grouped, totally or partially different resources are allocated to different groups, and terminals in a same group contend for resources allocated to the group. This mitigates a problem of resource collision that occurs when an uplink non-scheduled transmission solution is used, thereby achieving a technical effect of reducing a probability of resource collision during uplink non-scheduled transmission. Further, the solutions in the embodiments of the present invention mitigate a problem that a transmission delay and power consumption of the terminal increases due to resource collision.

BRIEF DESCRIPTION OF DRAWINGS

To describe the technical solutions in embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following describes the technical solutions of the embodiments of the present invention with reference to the accompanying drawings in the embodiments of the present invention.

A network architecture and a service scenario described in the embodiments of the present invention are intended to describe the technical solutions in the embodiments of the present invention, but are not intended to limit the technical solutions provided in the embodiments of the present invention. A person of ordinary skill in the art may know that as the network architecture evolves and a new service scenario emerges, the technical solutions provided in the embodiments of the present invention are also applicable to a similar technical issue.

Figure 1:
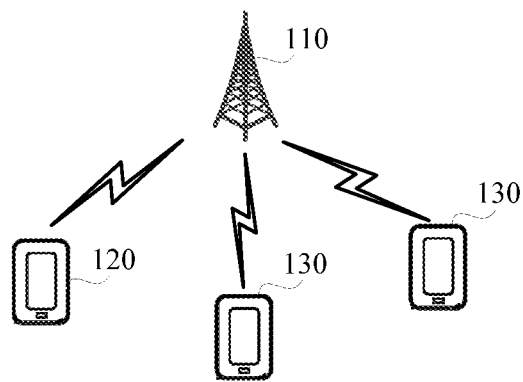
FIG. 1 is a schematic diagram of an application scenario according to an embodiment of the present invention.

FIG. 1 is a schematic diagram of a possible application scenario according to an embodiment of the present invention. The application scenario includes a base station 110 and at least one terminal.

As shown in FIG. 1, there are usually a plurality of terminals, and the plurality of terminals are located in a cell managed by the base station 110. In an embodiment of the present invention, a target terminal may be any terminal in the cell managed by the base station 110. For example, as shown in FIG. 1, the target terminal is denoted by a numeral 120, and other terminals different from the target terminal 120 in the cell managed by the base station 110 are all denoted by a numeral 130. In an embodiment of the present invention, an interaction process between the base station 110 and the target terminal 120 is used as an example for description. Interaction processes between the base station 110 and the other terminals 130 may be similar to the interaction process between the base station 110 and the target terminal 120.

The base station 110 and a terminal (such as the terminal 120 or the terminal 130) may communicate with each other using an air interface technology, for example, a cellular technology. The technical solutions described in the embodiments of the present invention may be applicable to a Long Term Evolution (LTE) system, or other wireless communications systems that use various wireless access technologies, for example, systems that use wireless access technologies such as Code Division Multiple Access (CDMA), Frequency Division Multiple Access (FDMA), Time Division Multiple Access (TDMA), orthogonal frequency division multiple access (OFDMA), and single carrier frequency division multiple access (SC-FDMA). In addition, the technical solutions may also be applicable to a subsequent evolved system of the LTE system, for example, a 5th Generation (5G) system. For clarity, only the LTE system is used as an example herein for description. In the LTE system, an evolved universal terrestrial radio access network (E-UTRAN) is used as a radio access network, and an evolved packet core (EPC) is used as a core network.

In the embodiments of the present invention, terms "network" and "system" are often interchangeably used, but meanings of the terms can be understood by a person skilled in the art. The terminal in the embodiments of the present invention may include various handheld devices with a wireless communication function, in-vehicle devices, wearable devices, computing devices, or other processing devices connected to a wireless modem, and various forms of user equipments (UE), mobile stations (MS), terminal devices, and the like. For ease of description, the devices mentioned above are collectively referred to as a terminal. An access network device in the embodiments of the present invention may be a base station (BS), and the base station is an apparatus that is deployed in a radio access network and that is configured to provide a wireless communication function for a terminal. The base station may include various forms of macro base stations, micro base stations, relay stations, access points, and the like. A device with a base station function may have different names in systems that use different wireless access technologies. For example, such a device is referred to as an evolved NodeB (eNB or eNodeB) in an LTE system, is referred to as a NodeB in a 3G communications system, and the like. For ease of description, in the embodiments of the present invention, the above-mentioned apparatuses that provide a wireless communication function for a terminal are collectively referred to as a base station or a BS.

In an existing uplink non-scheduled transmission solution, a same resource may be used by a plurality of terminals. This leads to a problem of resource collision. Resource collision means that, during uplink transmission, a plurality of terminals use resources that are totally or partially the same, and as a result, a base station possibly cannot correctly obtain uplink data transmitted by some or all of the plurality of terminals. For example, when the plurality of terminals use a same time-frequency resource during uplink transmission, the base station usually considers that only one terminal uses the time-frequency resource to transmit uplink data, and uplink data transmitted by another terminal is an interference signal in this case. Consequently, a signal-to-noise ratio of the terminal is very low, and the base station cannot correctly obtain uplink data transmitted by each terminal. In addition, once a resource collision problem occurs, a terminal that has not successfully sent data retransmits the data, increasing a transmission delay and power consumption of the terminal.

Therefore, the embodiments of the present invention provide a data transmission method, and a base station, a terminal, and a system that are based on the method. It should be noted that in the embodiments of the present invention, a non-scheduled transmission solution is used for uplink transmission, and no limitation is imposed on a transmission solution used for downlink transmission. A core idea of the technical solutions provided in the embodiments of the present invention is that, during uplink non-scheduled transmission, a quantity of terminals contending for a same resource is reduced to mitigate a problem of resource collision. For example, in the solutions in the embodiments of the present invention, terminals in a cell managed by a base station are grouped, totally or partially different resources are allocated to different groups, and terminals in a same group contend for a resource allocated to the group. In this way, a probability of resource collision during uplink non-scheduled transmission is reduced.

The resource in the embodiments of the present invention may be a time-frequency resource, a spreading code, a scrambling code, a timeslot, a codebook in non-orthogonal transmission, a parameter or setting in multi-user multiple input multiple output (MU-MIMO), or the like. For example, the non-orthogonal transmission may be sparse code multiple access (SCMA) or resource spread multiple access (RSMA). For another example, the parameter or setting in the MU-MIMO may include a pilot value, a pilot cyclic shift, a case of whether an orthogonal cover code (OCC) is used, an OCC setting when the OCC is used, or a time-frequency resource, a code resource, a timeslot resource, or a codebook resource used by a pilot. In the embodiments of the present invention, a resource allocated to each group may be any of the foregoing resources, or may be a combination of at least two resources.

The following further describes the embodiments of the present invention in detail based on common aspects of the embodiments of the present invention.

Figure 2:
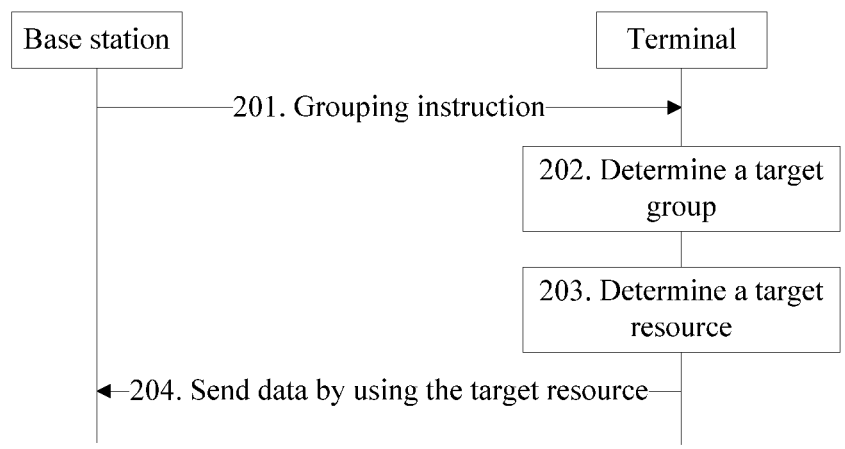
FIG. 2 is a schematic communication diagram of a data transmission method according to an embodiment of the present invention.

FIG. 2 is a schematic communication diagram of a data transmission method according to an embodiment of the present invention. The method may be applied to the application scenario shown in FIG. 1. The method may include the following parts or operations.

In a part 201, a base station sends a grouping instruction to a target terminal. For example, the base station broadcasts the grouping instruction in a cell in which the target terminal is located.

The grouping instruction is used to group, in a preset grouping manner, terminals in a cell in which the target terminal is located into N groups, where totally or partially different resources are allocated to terminals in different groups of the N groups, a resource corresponding to an $i^{th}$ group of the N groups is used by a terminal in the $i^{th}$ group in uplink non-scheduled transmission, N is an integer greater than 1, and i is a positive integer less than or equal to N.

The target terminal may be any terminal in a cell managed by the base station, such as the terminal 120 in the application scenario shown in FIG. 1.

In an example, the preset grouping manner includes at least one of the following: a random grouping manner, a path-loss-based grouping manner, or a beam-based grouping manner.

In another example, before sending the grouping instruction to the target terminal, the base station may further determine that the terminals in the cell in which the target terminal is located need to be grouped.

In still another example, the base station may further send, to the target terminal, at least one of the following: a manner parameter, a grouping parameter, or a resource parameter, where the manner parameter is used to indicate the preset grouping manner, the resource parameter is used to indicate a resource corresponding to each of the N groups, and the grouping parameter includes at least one of the following cases: when the preset grouping manner includes the random grouping manner, the grouping parameter includes one or both of the following: a total quantity N of the groups or an index of each of the N groups; when the preset grouping manner includes the path-loss-based grouping manner, the grouping parameter includes one or both of the following: a signal quality measurement manner, or a signal quality range corresponding to each of the N groups; and when the preset grouping manner includes the beam-based grouping manner, the grouping parameter includes one or both of the following: a correspondence between each of the N groups and a discovery signal transmitted on a beam, or an index of a beam in use.

In a part 202, the target terminal determines, based on the preset grouping manner, a target group to which the target terminal belongs.

In an example, the preset grouping manner includes the random grouping manner. For example, in this manner, the target terminal may randomly select a group from the N groups, as the target group.

In another example, the preset grouping manner includes the path-loss-based grouping manner. In this manner, the base station may send a downlink signal to the target terminal. Correspondingly, after receiving the downlink signal sent by the base station, the terminal may determine a signal quality range to which signal quality of the downlink signal belongs, and determine a group corresponding to the signal quality range, as the target group. For example, the terminal may determine, based on a correspondence between a signal quality range and a group, the group corresponding to the signal quality range, as the target group. The correspondence may include at least two correspondences between signal quality ranges and groups. Further, before determining the signal quality range to which the signal quality of the downlink signal belongs, the terminal may further obtain the signal quality of the downlink signal.

In another example, the preset grouping manner includes the beam-based grouping manner. For example, in this manner, the base station may transmit at least one beam in the cell in which the target terminal is located, where the at least one beam is used to transmit a discovery signal. Correspondingly, the target terminal may determine, based on a reception status of the discovery signal, the target group to which the target terminal belongs.

In a part 203, the target terminal determines a target resource from a resource corresponding to the target group.

In a part 204, the target terminal sends data to the base station using the target resource.

Correspondingly, the base station receives the data that is sent by the target terminal using the target resource.

In an example, the base station may further obtain at least one of the following information: an uplink traffic volume of the cell, a resource usage status of the cell, an uplink traffic volume corresponding to the $i^{th}$ group, a usage status of the resource corresponding to the $i^{th}$ group, log information reported by the terminal in the $i^{th}$ group, or a quantity of terminals in the $i^{th}$ group; and based on at least one of the information, the base station may adjust the N groups or cancel grouping of the N groups.

In the solution provided in an embodiment of the present invention, the terminals in the cell managed by the base station are grouped, totally or partially different resources are allocated to different groups, and terminals in a same group contend for resources allocated to the group. This mitigates a problem of resource collision that occurs when an uplink non-scheduled transmission solution is used, thereby achieving a technical effect of reducing a probability of resource collision during uplink non-scheduled transmission. Further, this mitigates a problem that a transmission delay and power consumption of the terminal increases due to resource collision.

Figure 3A:
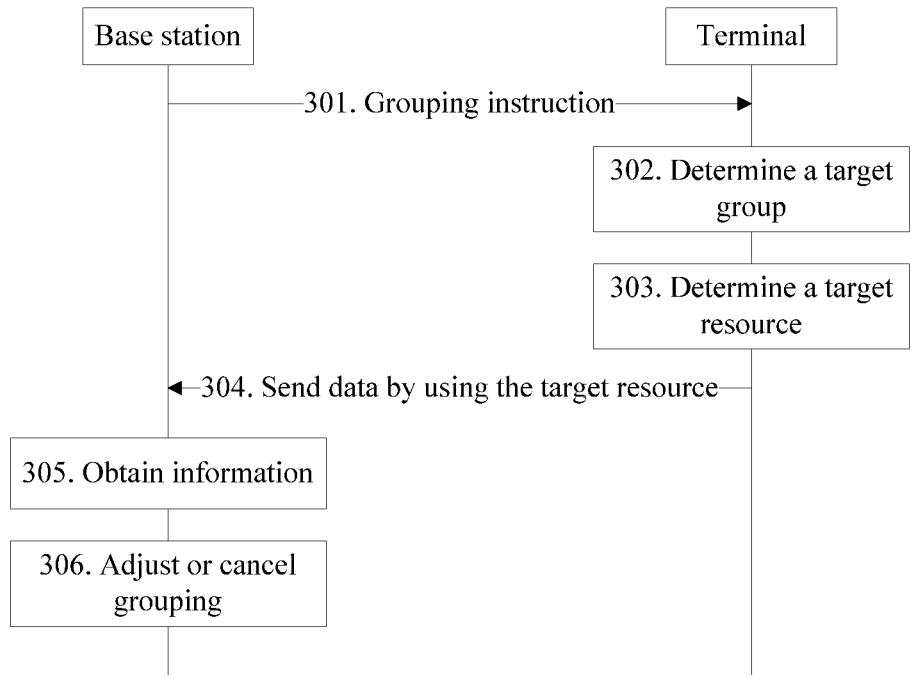
FIG. 3A is a schematic communication diagram of another data transmission method according to an embodiment of the present invention.

FIG. 3A is a schematic communication diagram of another data transmission method according to an embodiment of the present invention. In the method shown in FIG. 3, for content that is the same as or similar to that in the method shown in FIG. 2, reference may be made to detailed descriptions in FIG. 2. Details are not described herein again. In FIG. 3A, an example in which a target terminal is a terminal 120 is used for description. The method may include the following parts or operations.

In a part 301, a base station sends a grouping instruction to the terminal 120. In the part 301, for content that is the same as or similar to the part 201 in FIG. 2, reference may be made to detailed descriptions of the part 201.

In an example, the base station may broadcast the grouping instruction to terminals in a cell. In the application scenario shown in FIG. 1, the base station 110 may broadcast the grouping instruction to the terminal 120 and the other terminals 130. For example, the grouping instruction may be an on/off setting value. When the on/off setting value is "on", it indicates that the terminals in the cell need to be grouped. When the on/off setting value is "off", it indicates that the terminals in the cell do not need to be grouped.

In another example, when the preset grouping manner includes one or both of a path-loss-based grouping manner or a beam-based grouping manner, the base station may further perform the following operations.

For example, when the preset grouping manner includes the path-loss-based grouping manner, the base station may further send a downlink signal to the terminal 120, so that the terminal 120 determines, based on signal quality of the received downlink signal, a target group to which the terminal 120 belongs. In one embodiment, the base station broadcasts the downlink signal to the terminals in the cell, so that the terminals in the cell determine, based on signal quality of the received downlink signal, groups to which the terminals respectively belong. For example, in the application scenario shown in FIG. 1, the base station 110 may broadcast the downlink signal to the terminal 120 and the other terminals 130. The downlink signal may be an existing signal that is pre-specified in a communications system. For example, the base station may send a synchronization signal to the terminal, and the terminal determines, based on the synchronization signal, the base station that serves the terminal. In an embodiment of the present invention, the terminal may further determine, based on signal quality of the synchronization signal, the group to which the terminal belongs. Alternatively, the downlink signal may be a pilot signal (also referred to as a reference signal) that is specially used for signal quality measurement by the terminal in the communications system, and the terminal may determine, based on signal quality of the pilot signal, the group to which the terminal belongs. Alternatively, the downlink signal may be a newly added signal in the communications system, for example, a pilot signal that is redesigned to be used by the terminal to measure signal quality.

For another example, when the preset grouping manner includes the beam-based grouping manner, the base station may further transmit at least one beam in the cell in which the terminal 120 is located. The at least one beam is used to transmit a discovery signal, so that the terminal 120 determines, based on a reception status of the discovery signal, the target group to which the terminal 120 belongs. Different beams may be used to transmit a same discovery signal or different discovery signals. When the base station has a plurality of antennas, the base station may transmit different beams using the plurality of antennas. When the base station needs to transmit a plurality of beams, the plurality of beams may be transmitted in a polling manner. To be specific, a first beam is transmitted first, and after a period of time, transmission of the first beam is stopped and a second beam is transmitted. The rest may be deduced by analogy. In other words, the plurality of beams are sequentially transmitted one by one in a polling period. Alternatively, the plurality of beams may be transmitted simultaneously.

In still another example, before sending the grouping instruction to the terminal 120, the base station may further determine whether the terminals in the cell need to be grouped. After determining that the terminals in the cell need to be grouped, the base station sends the grouping instruction to the terminal 120. In one embodiment, the base station may determine, in the following manners, whether the terminals in the cell need to be grouped: The base station obtains a related index corresponding to the cell, and if the related index is greater than a preset threshold, the base station determines that the terminals in the cell need to be grouped. The related index corresponding to the cell is used to indicate a resource sufficiency status of the cell. The related index corresponding to the cell may include one or both of the following: an uplink traffic volume of the cell or a resource usage status of the cell. The uplink traffic volume of the cell indicates a traffic volume of uplink non-scheduled transmission in the cell. In this embodiment of the present invention, the manner indicating the uplink traffic volume should not be limiting. For example, the uplink traffic volume of the cell may be indicated by a quantity of data packets that are sent by the terminals in the cell and that are received by the base station per unit time. For another example, the resource usage status of the cell may be indicated by a resource utilization of the cell, where the resource utilization of the cell is a utilization of a resource used by the terminals in the cell in uplink non-scheduled transmission.

In the foregoing manner, the base station verifies, based on the uplink traffic volume of the cell and/or the resource usage status of the cell, whether the terminals in the cell need to be grouped, so that a timing for triggering the grouping meets a predetermined requirement and is more accurate, thereby more effectively reducing a probability of resource collision. Certainly, in another embodiment, the base station may alternatively verify, based on other conditions, whether the terminals in the cell need to be grouped. This is not limited in this embodiment. For example, a service busy period and a service idle period are preset. When the busy period is reached, the base station sends the grouping instruction to the terminal 120.

In still another example, at least one of the manner parameter, the grouping parameter, or the resource parameter may be pre-specified between the base station and the terminal. Alternatively, the base station may send, to the terminal, at least one of the manner parameter, the grouping manner, or the resource parameter. In other words, any one or more of the manner parameter, the grouping manner, or the resource parameter may be pre-specified, or may be sent by the base station. A manner of obtaining the three types of parameters by the terminal is not limited, and manners of obtaining different parameters of the three types of parameters by the terminal may be different.

In one embodiment, the manner parameter may include one or more parameters. For example, a parameter A indicates a random grouping manner, a parameter B indicates the path-loss-based grouping manner, and a parameter C indicates the beam-based grouping manner. When the preset grouping manner includes the random grouping manner, the manner parameter may include the parameter A; and when the preset grouping manner includes one or both of the path-loss-based grouping manner and the beam-based grouping manner, the manner parameter may include the parameter B and/or the parameter C.

In another embodiment, the grouping parameter includes at least one of the following cases.

Case 1: When the preset grouping manner includes the random grouping manner, the grouping parameter includes one or both of the following: a total quantity N of the groups or an index of each of the N groups. For example, the total quantity of the groups is 4, and indexes of the four groups are a group 1, a group 2, a group 3, and a group 4, respectively.

Case 2: When the preset grouping manner includes the path-loss-based grouping manner, the grouping parameter includes one or both of the following: a signal quality measurement manner, or a signal quality range corresponding to each of the N groups. The signal quality measurement manner is used to indicate which parameter is used by the terminal 120 to measure signal quality of the downlink signal, for example, may be a signal reception power on full bandwidth, a signal reception power of a special channel, and a signal reception power on a particular time-frequency resource. The signal quality range corresponding to each of the N groups may include a total quantity of ranges and a start point and an end point of each range. For example, the signal quality of the downlink signal is measured using a signal reception power of the downlink signal, and the start and end points of each range are set to −110 dBm, −90 dBm, −70 dBm, and −50 dBm. The signal reception power is divided into five ranges: (1) less than −110 dBm; (2) greater than or equal to −110 dBm and less than −90 dBm; (3) greater than or equal to −90 dBm and less than −70 dBm; (4) greater than or equal to −70 dBm and less than −50 dBm; (5) greater than or equal to −50 dBm.

Case 3: When the preset grouping manner includes the beam-based grouping manner, the grouping parameter includes one or both of the following: a correspondence between each of the N groups and a discovery signal transmitted on a beam, or an index of the beam in use. For example, 10 beams and discovery signals correspondingly transmitted on the 10 beams are pre-specified. However, in an actual operation process, the base station only uses five of the 10 beams, and the base station may notify the terminal 120 of indexes of the five beams in use. In the foregoing manner, the terminal 120 may reduce a search range from 10 beams to five beams, so as to reduce complexity of searching for a beam by the terminal 120.

In this example, some or all of the manner parameter, the grouping parameter, and the resource parameter may be obtained by the terminal in a pre-specified manner, or may be sent by the base station to the terminal. If the pre-specified manner is used, an amount of data sent by the base station may be reduced. If the parameters are sent by the base station, grouping control and resource allocation are more flexible. In addition, when the parameters are sent by the base station, the parameters may be sent to the terminal together with the grouping instruction (such as the on/off setting value), or may be sent to the terminal separately from the grouping instruction, or different parameters may be sent separately for a plurality of times. In this embodiment of the present invention, a quantity of times and a sequence of sending the parameters are not limited.

In a part 302, after receiving the grouping instruction sent by the base station, the terminal 120 determines, based on the preset grouping manner, the target group to which the target terminal 120 belongs. In the part 302, for content that is the same as or similar to the part 202 shown in FIG. 2, reference may be made to detailed descriptions of the part 202.

In an example, when the preset grouping manner is the random grouping manner, the terminal 120 may randomly select a group from the N groups, as the target group. For example, the total quantity N of the groups is pre-specified as 4, or the base station indicates, to the terminal 120 using the grouping parameter, that the total quantity of the groups is 4. Then the terminal 120 randomly selects a group from the four groups, as the target group to which the terminal 120 belongs. The random grouping manner is relatively simple in implementation, and can ensure a relatively balanced quantity of terminals in each group.

In another example, when the preset grouping manner includes the path-loss-based grouping manner, the terminal 120 receives the downlink signal sent by the base station, obtains the signal quality of the downlink signal, determines a signal quality range to which the signal quality belongs, and determines, based on a preset correspondence, a group corresponding to the signal quality range, as the target group. The preset correspondence includes at least two correspondences between signal quality ranges and groups. The preset correspondence may be pre-specified, or may be indicated by the base station to the terminal using the grouping parameter. For example, the terminal 120 learns that the signal reception power of the downlink signal is −80 dBm, and division of signal quality ranges is described as an example in the part 301. In this case, a signal quality range to which −80 dBm belongs is the range "greater than or equal to −90 dBm and less than −70 dBm". Assuming that the range is corresponding to a group 3, the terminal 120 uses the group 3 as the target group. In the path-loss-based grouping manner, a quantity of groups may be controlled by controlling a quantity of signal quality ranges, and a terminal in each group may be controlled by controlling a start point and an end point of a signal quality range. When the terminals are grouped in this manner, a group to which a terminal belongs is related to a geographical location of the terminal.

In another example, when the preset grouping manner includes the beam-based grouping manner, the terminal 120 determines, based on a reception status of the discovery signal, the target group to which the terminal 120 belongs. If the terminal 120 receives the discovery signal transmitted by the base station using the beam, the terminal 120 determines, based on the discovery signal and according to a preset grouping rule, the target group to which the terminal 120 belongs. If the terminal 120 does not receive the discovery signal, the terminal 120 determines, according to a preset grouping rule, the target group to which the terminal 120 belongs. The base station is configured to transmit at least one beam to the cell managed by the base station, and different beams are used to transmit a same discovery signal or different discovery signals. The preset grouping rule specifies a correspondence between a reception status of a discovery signal and a group. For example, the base station transmits two beams to the cell, where one beam is used to transmit a discovery signal A, and the other beam is used to transmit a discovery signal B. In this case, the preset grouping rule may specify that: If a terminal in the cell receives neither the discovery signal A nor the discovery signal B, the terminal belongs to a group 1; if a terminal in the cell receives the discovery signal A but does not receive the discovery signal B, the terminal belongs to a group 2; and if a terminal in the cell receives the discovery signal B but does not receive the discovery signal A, the terminal belongs to a group 3.

The path-loss-based grouping manner and the beam-based grouping manner can implement targeted control over a terminal or some terminals entering a target group, and implement more controllable and flexible grouping.

Figure 3B:
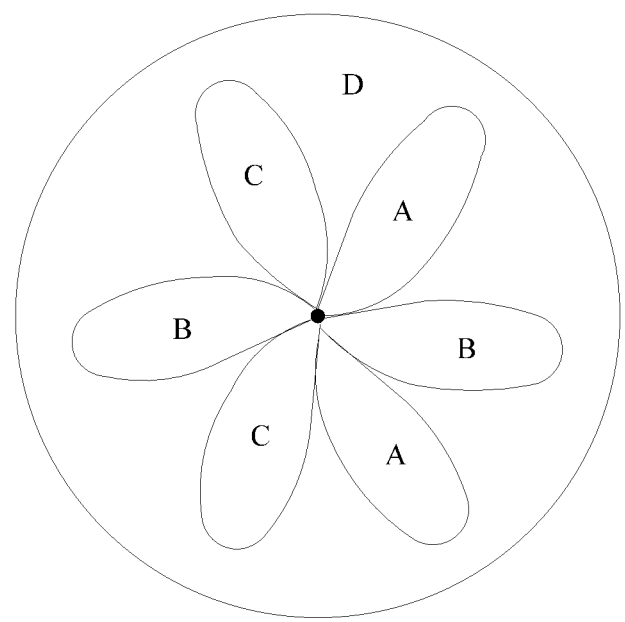
FIG. 3B is a schematic diagram of a beam-based grouping manner.

As shown in FIG. 3B, FIG. 3B is a schematic diagram of dividing a cell into several areas in the beam-based grouping manner. In FIG. 3B, a base station transmits three beams to the cell. Each beam includes two main lobes, and the three beams divide the cell into four areas A, B, C, and D. If a terminal receives a discovery signal transmitted on a beam, it indicates that the terminal is located in an area covered by the beam. If the terminal receives no discovery signal, it indicates that the terminal is located in an area beyond coverage of the beam, that is, the area D in FIG. 3B. Terminals located in different areas are grouped into different groups. As shown in FIG. 3B, the three beams group terminals in the cell into four groups. For example, a group 1 includes a terminal in the area A, a group 2 includes a terminal in the area B, a group 3 includes a terminal in the area C, and a group 4 includes a terminal in the area D. In addition, when the base station transmits a plurality of beams in a polling manner, if a terminal does not receive, in a polling period, any discovery signal transmitted by the base station using a beam, the terminal determines that the terminal is located in an area beyond coverage of the beam. The polling period may be pre-specified, or may be indicated by the base station to the terminal.

It should be noted that there may be a case in which a plurality of beams, for example, the three beams shown in FIG. 3B, are used to transmit a same discovery signal. A possible cause of the foregoing case may be that the base station purposely controls, according to a stipulation pre-specified in a protocol, a plurality of beams to be used to transmit a same discovery signal, so that terminals in an area covered by the plurality of beams belong to a same group. When necessary, the base station may also purposely control the plurality of beams to be used to transmit different discovery signals, to adjust terminal grouping. Another possible cause of the foregoing case is that a beam-forming mechanism determines that a same discovery signal is transmitted on a plurality of beams. In this case, the discovery signal transmitted on the beams is determined by the beam-forming mechanism, and cannot be adaptively changed by the base station.

It should be further noted that for any discovery signal, when determining whether the terminal receives the discovery signal, the terminal may consider signal quality of the discovery signal. Specifically, after detecting a discovery signal, the terminal obtains signal quality of the discovery signal. If the signal quality of the discovery signal is greater than a preset threshold, the terminal determines that the discovery signal is received. Otherwise, if the signal quality of the discovery signal is less than a preset threshold, the terminals determine that the discovery signal is not received.

Figure 3C:
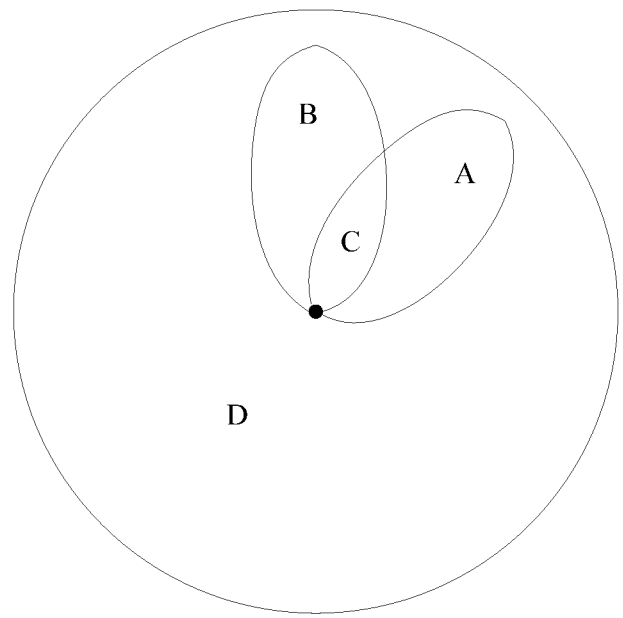
FIG. 3C is a schematic diagram of another beam-based grouping manner.

Optionally, areas covered by different beams may overlap each other. As shown in FIG. 3C, FIG. 3C is a schematic diagram of dividing a cell into several areas in the beam-based grouping manner. In FIG. 3C, a base station transmits two beams to a cell, where an area covered by one beam is A, an area covered by the other beam is B, and there is an overlapped area C. In one embodiment, an overlapping area for areas covered by a plurality of beams is included in an area covered by one of the plurality of beams. For example, the overlapping area C is included in the area A. The two beams shown in FIG. 3C divide the cell into three areas: the area A, an area different from the area C in the area B, and an area D. Correspondingly, the two beams group terminals in the cell into three groups. In another embodiment, an overlapped area of areas covered by a plurality of beams serves as an independent area. For example, the overlapped area C serves as an independent area. In this case, the two beams shown in FIG. 3C divide the cell into four areas: an area different from the area C in the area A, an area different from the area C in the area B, the area C, and an area D. Correspondingly, the two beams group terminals in the cell into four groups.

In addition, during grouping of the terminals in the cell, one grouping manner or a combination of a plurality of grouping manners may be used. When a combination of the path-loss-based grouping manner and one or more other grouping manners is used, in the foregoing preset correspondence, each signal quality range is corresponding to one or more groups. When a combination of the beam-based grouping manner and one or more other grouping manners is used, in the foregoing preset grouping rule, a reception status of each discovery signal is corresponding to one or more groups.

Figure 3D:
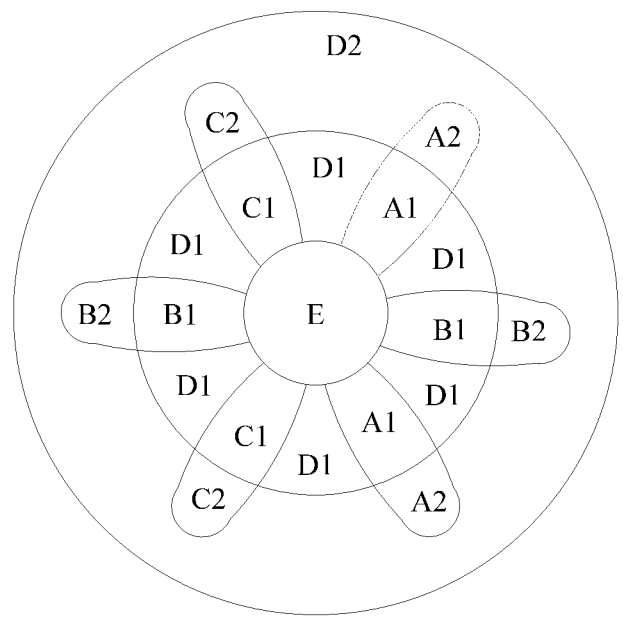
FIG. 3D is a schematic diagram of a manner that combines a path-loss-based grouping manner and a beam-based grouping manner.

In an example, a combination of the path-loss-based grouping manner and the beam-based grouping manner is used. For example, after determining the signal quality range to which the signal quality of the downlink signal belongs, the terminal 120 may obtain, based on the preset correspondence, one or more groups corresponding to the signal quality range. In addition, the terminal 120 determines, based on the reception status of the discovery signal and according to the preset grouping rule, one or more groups corresponding to the reception status of the discovery signal. The terminal 120 uses a public group of the one or more groups corresponding to the signal quality range and the one or more groups corresponding to the reception status of the discovery signal, as the target group to which the terminal 120 belongs. As shown in FIG. 3D, FIG. 3D is a schematic diagram of dividing a cell into several areas using a combination of the path-loss-based grouping manner and the beam-based grouping manner. In the figure, a combination of a letter and a numeral is used to indicate an area, and each area is corresponding to one group.

In another example, a combination of the random grouping manner and the path-loss-based grouping manner is used. For example, after determining the signal quality range to which the signal quality of the downlink signal belongs, the terminal 120 obtains, based on the preset correspondence, one or more groups corresponding to the signal quality range, and the terminal 120 randomly selects, from the one or more groups corresponding to the signal quality range, one group as the target group to which the terminal 120 belongs.

In still another example, a combination of the random grouping manner and the beam-based grouping manner is used. For example, the terminal 120 may determine, based on the reception status of the discovery signal and according to the preset grouping rule, one or more groups corresponding to the reception status of the discovery signal, and the terminal 120 randomly selects, from the one or more groups corresponding to the reception status of the discovery signal, one group as the target group to which the terminal 120 belongs.

In still another example, a combination of the random grouping manner, the path-loss-based grouping manner, and the beam-based grouping manner is used. For example, the terminal 120 may obtain a public group (each public group includes one or more groups) using the manner described in the foregoing first example, and then randomly select, from the public group, one group as the target group to which the terminal 120 belongs.

The cell may be divided into more areas using a combination of a plurality of grouping manners, so as to implement more refined and diversified grouping of the terminals in the cell.

In a part 303, the terminal 120 determines a target resource from a resource corresponding to the target group.

Totally or partially different resources are allocated to terminals in different groups of the N groups. A resource corresponding to each of the N groups may be pre-specified, or may be indicated by the base station to the terminal using a resource parameter.

In an example, a resource includes two items: a time-frequency resource and a pilot cyclic shift. It is assumed that one subframe or one frame includes a total of four time-frequency resources: A1, A2, A3, and A4. Each time-frequency resource includes several symbols (for example, single carrier frequency division multiple access (FDMA) symbols and orthogonal frequency division multiplexing (OFDM) symbols) and subcarriers. In addition, it is assumed that there are a total of four pilot cyclic shifts: B1, B2, B3, and B4. For example, the foregoing resources (namely, combinations of time-frequency resources and pilot cyclic shifts) are grouped into four groups, and resources of each group are shown in Table-1 below.

TABLE 1

| Group Number | Resource |
|---|---|
| 1 | (1) A1 + B1, (2) A3 + B1, (3) A1 + B2, (4) A3 + B2 |
| 2 | (1) A1 + B3, (2) A3 + B3, (3) A1 + B4, (4) A3 + B4 |
| 3 | (1) A2 + B1, (2) A4 + B1, (3) A2 + B2, (4) A4 + B2 |
| 4 | (1) A2 + B3, (2) A4 + B3, (3) A2 + B4, (4) A4 + B4 |

For example, when the terminal 120 determines that the target group to which the terminal 120 belongs is a group 1, the terminal 120 selects one resource combination from the four resource combinations (1) A1+B1, (2) A3+B1, (3) A1+B2, and (4) A3+B2, as the target resource.

The base station can parse out signals of two terminals using an MU-MIMO technology, provided that combinations of time-frequency resources and pilot cyclic shifts used by the two terminals are not completely the same, to be specific, both the time-frequency resources and the pilot cyclic shifts are not the same, the time-frequency resources are the same but the pilot cyclic shifts are different, or the pilot cyclic shifts are the same but the time-frequency resources are different.

If the terminals and resources are not grouped, each terminal may randomly select one resource combination from the 16 resource combinations, as the target resource. If the terminals are grouped into four groups, and four resource combinations are allocated to each group, each terminal can select one resource combination only from the four resource combinations, as the target resource. When terminals simultaneously performing uplink non-scheduled transmission are evenly distributed in each group, a probability of resource collision may be effectively reduced after the terminals and resources are grouped.

In a part 304, the terminal 120 sends data to the base station using the target resource.

For example, when the target resource includes a time-frequency resource, the terminal 120 sends data to the base station using the time-frequency resource. For another example, when the target resource includes a parameter or setting in MU-MIMO, the terminal 120 sends data to the base station based on the parameter or setting.

Correspondingly, the base station receives the data that is sent by the terminal 120 using the target resource.

In a part 305, the base station obtains at least one of the following information: an uplink traffic volume of the cell, a resource usage status of the cell, an uplink traffic volume corresponding to an $i^{th}$ group, a usage status of a resource corresponding to the $i^{th}$ group, log information reported by a terminal in the $i^{th}$ group, or a quantity of terminals in the $i^{th}$ group.

The base station obtains a related index corresponding to the cell, and/or a related index corresponding to one or more of the N groups. The related index corresponding to the cell is used to indicate a resource sufficiency status of the cell. A related index corresponding to the $i^{th}$ group of the N groups is used to indicate a resource sufficiency status of the $i^{th}$ group.

As described above, the related index corresponding to the cell includes one or both of the following: the uplink traffic volume of the cell or the resource usage status of the cell. For details, refer to the foregoing descriptions. Details are not described herein again.

The related index corresponding to the $i^{th}$ group includes one or all of the following: an uplink traffic volume corresponding to the $i^{th}$ group, a usage status of the resource corresponding to the $i^{th}$ group, log information reported by the terminal in the $i^{th}$ group, or a quantity of terminals in the $i^{th}$ group. The uplink traffic volume corresponding to the $i^{th}$ group is a traffic volume of uplink non-scheduled transmissions of the terminal in the $i^{th}$ group. In this embodiment of the present invention, a manner of indicating the uplink traffic volume is not limited. For example, the uplink traffic volume corresponding to the $i^{th}$ group may be indicated by a quantity of data packets that are sent by the terminal in the $i^{th}$ group and that are received by the base station per unit time. The usage status of the resource corresponding to the $i^{th}$ group may be a utilization of the resource corresponding to the $i^{th}$ group, that is, a utilization of a resource used by the terminal in the $i^{th}$ group in uplink non-scheduled transmission. The terminal 120 is used as an example. Log information reported by the terminal 120 may include a quantity of transmission failures of the terminal 120 in a past target time period, a range (for example, less than five times, six to 10 times, or more than 10 times) of a quantity of transmission failures of the terminal 120 in a past target time period, or a quantity of transmission failures of the terminal 120 in a past target time period and a resource that is used when transmission fails. In addition, a terminal may also report, to the base station, a group to which the terminal belongs, and the base station collects statistics about groups to which all the terminals belong, and determines a quantity of terminals in each group. The terminal may directly report, to the base station, the group to which the terminal belongs, or may notify, by reporting other equivalent information to the base station, the base station of the group to which the terminal belongs. For example, when the path-loss-based grouping manner is used, the terminal reports, to the base station, the signal quality of the downlink signal. For another example, when the beam-based grouping manner is used, the terminal reports, to the base station, a beam that covers the terminal.

It should be noted that in actual application, not all terminals are required to possess a capability of reporting information to the base station. In other words, the base station does not require that all the terminals in the cell possess the capability of reporting information to the base station. For example, a type of terminal reports information to the base station.

In addition, using the terminal 120 as an example, the base station may also determine, based on a resource used by the terminal 120, the group to which the terminal 120 belongs. In addition, resources allocated to different groups may be partially the same, for example, resources allocated to a group 1 include resources 1, 2, 3, and 4, resources allocated to a group 2 include resources 3, 4, 5, and 6, and resources allocated to a group 3 include resources 1, 2, 5, and 6. Therefore, based only on the resource used by the terminal 120, the base station cannot accurately determine the target group to which the terminal 120 belongs. In this case, if a grouping manner being used is the path-loss-based grouping manner, the base station may more accurately determine the target group to which the terminal 120 belongs, with reference to a signal reception power of a received uplink signal sent by the terminal 120, or a modulation and coding scheme (MCS) used by the terminal 120.

In a part 306, based on at least one of the information, the base station adjusts the N groups or cancels grouping of the N groups.

In an example, if the related index corresponding to the cell is less than a preset threshold, the base station sends a grouping cancellation instruction to the terminals in the cell. The grouping cancellation instruction is used to cancel grouping of the terminals in the cell. For example, when the base station determines to cancel grouping of the terminals in the cell, the base station broadcasts a grouping on/off setting value to the terminals in the cell, with the on/off setting value being "off".

For example, the related index corresponding to the cell is the uplink traffic volume corresponding to the cell. When the uplink traffic volume corresponding to the cell is less than a preset threshold, it indicates that a traffic volume of uplink non-scheduled transmission is relatively small, and a probability of resource collision between the terminals in the cell is relatively low. In this case, the base station sends the grouping cancellation instruction to the terminals in the cell.

In another example, if related indexes corresponding to the N groups are all less than first thresholds respectively corresponding to the groups, the base station sends the grouping cancellation instruction to the terminals in the cell. The first thresholds respectively corresponding to the groups may be the same or may be different, and the first thresholds may be pre-specified.

For example, the related index corresponding to each group is an uplink traffic volume corresponding to each group. When a traffic volume of uplink non-scheduled transmission in each group is less than a first traffic volume threshold corresponding to the group, the base station sends the grouping cancellation instruction to the terminals in the cell. For another example, the related index corresponding to each group is a quantity of terminals in each group. When the quantity of terminals in each group is less than a first quantity threshold corresponding to the group, the base station sends the grouping cancellation instruction to the terminals in the cell.

Processing overheads of the base station and the terminal can be reduced to some extent by cancelling a grouping. For example, if a path-loss-based grouping manner is used, the base station needs to send a downlink signal to the terminals in the cell, and the terminal needs to obtain signal quality of the downlink signal to determine the target group to which the terminal belongs. After a grouping is cancelled, the base station and the terminal do not need to perform the foregoing operations. Therefore, processing overheads of the base station and the terminal are reduced.

In still another example, if the related index corresponding to the $i^{th}$ group is greater than a second threshold, the base station decreases the quantity of terminals in the $i^{th}$ group, and/or increases the resource corresponding to the $i^{th}$ group. Second thresholds respectively corresponding to the groups may be the same or may be different, and the second thresholds may be pre-specified.

For example, the related index corresponding to the group is a utilization of the $i^{th}$ resource corresponding to the $i^{th}$ group. When the utilization of the resource corresponding to the $i^{th}$ group is greater than a second utilization threshold, the base station decreases the quantity of terminals in the $i^{th}$ group, and/or increases the resource corresponding to the $i^{th}$ group. For example, when the beam-based grouping manner is used, the base station may reduce the quantity of terminals in the $i^{th}$ group by adjusting a beam direction or a beam width. Alternatively, the base station may allocate more resources to the $i^{th}$ group. For another example, the related index corresponding to the $i^{th}$ group is the quantity of terminals in the $i^{th}$ group. When the quantity of terminals in the $i^{th}$ group is greater than a second quantity threshold, the base station controls the quantity of terminals in the $i^{th}$ group to decrease, and/or controls the resource corresponding to the $i^{th}$ group to increase.

When the related index corresponding to the $i^{th}$ group is greater than the second threshold, the base station controls the quantity of terminals in the $i^{th}$ group to decrease, and/or controls the resource corresponding to the $i^{th}$ group to increase. In this way, a quantity of terminals contending for a resource is reduced, and a probability of resource collision is reduced.

Certainly, in another example, if the related index corresponding to the group is greater than the second threshold, the base station may also send the grouping cancellation instruction to the terminals in the cell. The grouping cancellation instruction is used to cancel grouping of the terminals in the cell. In some grouping manners, the base station may not be able to control, in a targeted manner, the quantity of terminals in the $i^{th}$ group to decrease, and a majority of resources may have been allocated to the $i^{th}$ group and a terminal in another group cannot have a necessary resource for data transmission. Therefore, when the related index corresponding to the $i^{th}$ group is greater than the second threshold, the base station may also cancel grouping, so as to ensure that the terminals can normally obtain a resource through contention.

In the foregoing manner, the base station can dynamically adjust, based on a resource usage status of each group, terminal grouping and resource allocation, so as to implement proper utilization of resources.

Figure 4:
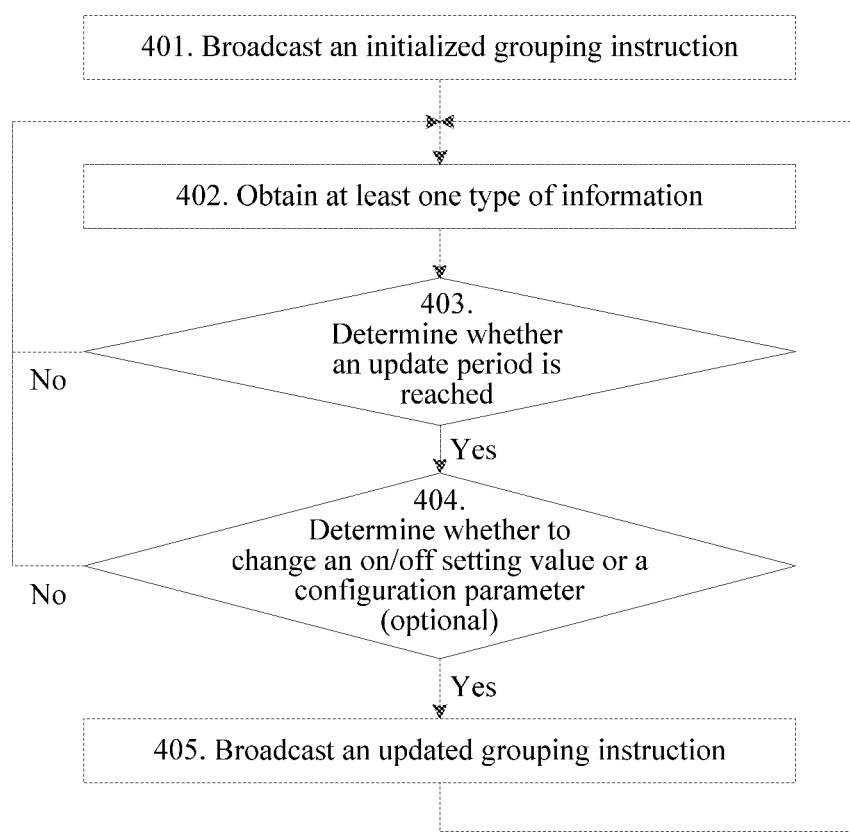
FIG. 4 is a schematic flowchart of another data transmission method according to an embodiment of the present invention.

FIG. 4 is a schematic flowchart of another data transmission method according to an embodiment of the present invention. The method shown in FIG. 4 may be executed by a base station. For content that is the same as or similar to that in the method shown in FIG. 2 to FIG. 3D, refer to detailed descriptions in FIG. 2 to FIG. 3D. Details are not described herein again.

In a part or operation 401, a base station broadcasts an initialized grouping instruction to terminals in a cell.

The initialized grouping instruction includes at least a default on/off setting value. The default on/off setting value may be set to "on", or may be set to "off". For example, after each restart, the base station broadcasts the default on/off setting value to the terminals in the cell, and where the on/off setting value is "on". Optionally, when broadcasting the initialized grouping instruction, the base station may further broadcast at least one of the following parameters: a manner parameter, a grouping parameter, or a resource parameter.

In a part 402, the base station obtains at least one type of information.

When the terminals in the cell are not grouped, the at least one type of information includes one or both of the following: an uplink traffic volume of the cell or a resource usage status of the cell.

When the terminals in the cell are already grouped, the at least one type of information includes some or all of the following: an uplink traffic volume of the cell, a resource usage status of the cell, an uplink traffic volume corresponding to an $i^{th}$ group, a usage status of a resource corresponding to the $i^{th}$ group, log information reported by a terminal in the $i^{th}$ group, or a quantity of terminals in the $i^{th}$ group.

For descriptions related to the foregoing information, refer to detailed descriptions in the method shown in FIG. 2 or FIG. 3A.

In a part 403, the base station determines whether an update period is reached. If yes, a part 404 is performed; or if no, the part 402 is performed again.

The update period is a time period for updating the grouping instruction, for example, may be five minutes or any other time period.

In the part 404, the base station determines, based on obtained information, whether the on/off setting value needs to be changed. Alternatively, the base station may determine whether to change at least one of the manner parameter, the grouping parameter, or the resource parameter. If yes, a part 405 is performed; or if no, the part 402 is performed again.

In the part 405, the base station broadcasts an updated grouping instruction to the terminals in the cell, and performs the part 402 again.

When broadcasting the updated grouping instruction, the base station may further broadcast at least one of an updated manner parameter, an updated grouping parameter, or an updated resource parameter.

To sum up, in the solution provided in some embodiments of the present invention, the terminals in the cell managed by the base station are grouped, totally or partially different resources are allocated to different groups, and terminals in a same group contend for a resource allocated to the group. This mitigates a problem of resource collision that occurs when an uplink non-scheduled transmission solution is used, thereby achieving a technical effect of reducing a probability of resource collision during uplink non-scheduled transmission. Further, this mitigates a problem that a transmission delay and power consumption of the terminal increases due to resource collision.

In an optional example provided based on the part 305 in FIG. 3A, manners in which the terminal reports information to the base station include the following two manners (the "information" in this embodiment may be the log information described in the part 305 in FIG. 3A, or may be other information such as a group to which the terminal belongs):

Manner 1: The terminal sends, to the base station using a particular resource, a preamble (preamble) in a particular format, and adds the information to the preamble to send the information to the base station.

This manner is applicable to a scenario in which information content is relatively simple, for example, the log information. The log information includes only a range to which a quantity of transmission failures in a past target time period belongs.

In an example, a communications system (for example, an LTE system) that uses an air interface technology (for example, SC-FDMA and OFDM) with a time-frequency structure is used as an example. The terminal reports, to the base station by sending the preamble, the range to which the quantity of transmission failures in the past target time period belongs. In the LTE system, a Zadoff-Chu sequence may be used as the preamble. A cyclic shift is a parameter of the preamble. In the LTE system, the terminal randomly selects the cyclic shift, and then sends the preamble. The sending may be performed only on a specified time-frequency resource. It should be noted that uplink non-scheduled transmission does not require the terminal to send the preamble to the base station to complete random access. In this embodiment, the terminal reports, to the base station by sending the preamble, the range to which the quantity of transmission failures in the past target time period belongs.

It is assumed that there are eight cyclic shifts for selection, and in one transmission time interval (TTI), two time-frequency resources are used to send the preamble. The eight cyclic shifts are grouped into four groups, two in each group. All the group of cyclic shifts indicate different ranges of the quantity of transmission failures, for example, respectively indicate that the quantity of transmission failures is 0 (that is, no failure), the quantity of transmission failures is 1, the quantity of transmission failures is 2, and the quantity of transmission failures is greater than 2. The terminal randomly selects a cyclic shift from a corresponding group based on the quantity of transmission failures in the past target time period, and randomly selects a time-frequency resource from two pre-specified time-frequency resources to send the preamble to the base station. Even if two terminals send the preamble in a same TTI, the base station can identify that there are two terminals sending the preamble, provided that at least one of a cyclic shift of the preamble and a time-frequency resource that are used by the two terminals is different. The base station may obtain, based on the cyclic shift of the preamble, information that the terminal expects to convey, that is, the range to which the quantity of transmission failures in the past target time period belongs. If both the cyclic shift of the preamble and the time-frequency resource that are used by the two terminals are the same, the base station can identify only that there is one terminal sending the preamble. To further reduce a probability of resource collision that occurs when the terminal sends the preamble, the terminal may be grouped. For example, a terminal in some groups can send the preamble only in an odd-numbered TTI, while a terminal in other groups can send the preamble only in an even-numbered TTI. In addition, the preamble does not need to be sent immediately, and may be sent after a time period.

In the foregoing manner, the terminal can report, to the base station, the quantity of transmission failures in the past target time period, so that the base station adjusts, based on data reported by a plurality of terminals, terminal grouping and/or resource allocation.

Manner 2: The terminal sends, in a pre-specified format, the information together with uplink data to the base station.

For example, the terminal adds, in the pre-specified format, the information to an end of the uplink data, to send the information to the base station. The uplink data herein is data sent by the terminal to the base station using an uplink non-scheduled transmission mode.

In this manner, when uplink non-scheduled transmission is successful, the information is transmitted to the base station together with the uplink data. The terminal may determine, based on a feedback from the base station (for example, a random access response (Random Access Response, RAR), an acknowledgement (ACK), or a negative acknowledgement (NACK) fed back by the base station), whether the information is sent successfully. Log information is used as an example. The log information may include the quantity of transmission failures in the past target time period. After sending the log information successfully, the terminal needs to reset a counter used to collect statistics about a quantity of transmission failures.

In addition, reporting information to the base station by the terminal may be periodically triggered. For example, the terminal reports the information to the base station at a preset time interval. Alternatively, reporting information to the base station by the terminal may be triggered by an event. To be specific, the terminal reports the information to the base station after detecting occurrence of a target event.

For example, the target event may be that the quantity of transmission failures in the past target time period exceeds a preset threshold.

The foregoing mainly describes the solutions provided in the embodiments of the present invention from a perspective of interaction between the base station and the terminal. It can be understood that, to implement the foregoing functions, the base station and the terminal include a corresponding hardware structure and/or software module for performing each function. Units and algorithm steps in examples described with reference to the embodiments disclosed in the present invention can be implemented by hardware or a combination of hardware and computer software in the embodiments of the present invention. Whether a function is performed by hardware or computer software driving hardware depends on particular applications and design constraints of the technical solutions. A person skilled in the art may use different methods to implement the described functions for each particular application, but it should not be considered that the implementation goes beyond the scope of the technical solutions in the embodiments of the present invention.

Figure 5:
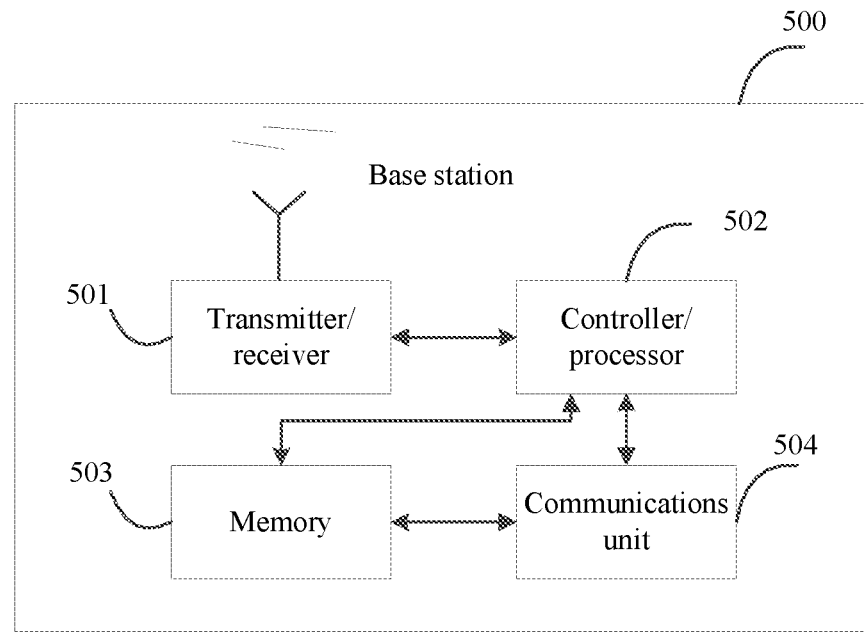
FIG. 5 is a schematic structural diagram of a base station according to an embodiment of the present invention.

FIG. 5 is a possible schematic structural diagram of a base station according to an embodiment of the present invention.

The base station 500 includes a transmitter/receiver 501 and a processor 502. The processor 502 may alternatively be a controller, and is denoted as a "controller/processor 502" in FIG. 5. The transmitter/receiver 501 is configured to support information transmission and reception between the base station and the terminal in the foregoing embodiments, and support radio communication between the terminal and another terminal. The processor 502 performs various functions for communicating with the terminal. On an uplink, an uplink signal from the terminal is received by an antenna, demodulated (for example, a high-frequency signal is demodulated into a baseband signal) by the receiver 501, and further processed by the processor 502 to restore service data and signaling message that are sent by the terminal. On a downlink, service data and a signaling message are processed by the processor 502, and modulated (for example, a baseband signal is modulated into a high-frequency signal) by the transmitter 501 to generate a downlink signal, and the downlink signal is transmitted to the terminal using an antenna. It should be noted that the demodulation or modulation functions may also be completed by the processor 502. For example, the processor 502 is further configured to perform the process 201 in FIG. 2, processes 301, 305, and 306 in FIG. 3A, processes 401 to 405 in FIG. 4, and/or other processes in the technical solutions described in the embodiments of the present invention.

Further, the base station 500 may further include a memory 503, and the memory 503 is configured to store program code and data used for the base station 500. In addition, the base station may further include a communications unit 504. The communications unit 504 is configured to support the base station in communicating with another network entity (for example, a network device in a core network). For example, in an LTE system, the communications unit 504 may be an S1-U interface, configured to support the base station in communicating with a serving gateway (SGW); alternatively, the communications unit 504 may be an S1-MME interface, configured to support the base station in communicating with a mobility management entity (MME).

It can be understood that FIG. 5 shows only a simplified design of the base station 500. In actual application, the base station 500 may include any quantities of transmitters, receivers, processors, controllers, memories, communications units, and the like. All base stations that can implement the embodiments of the present invention fall within the protection scope of the embodiments of the present invention.

Figure 6:
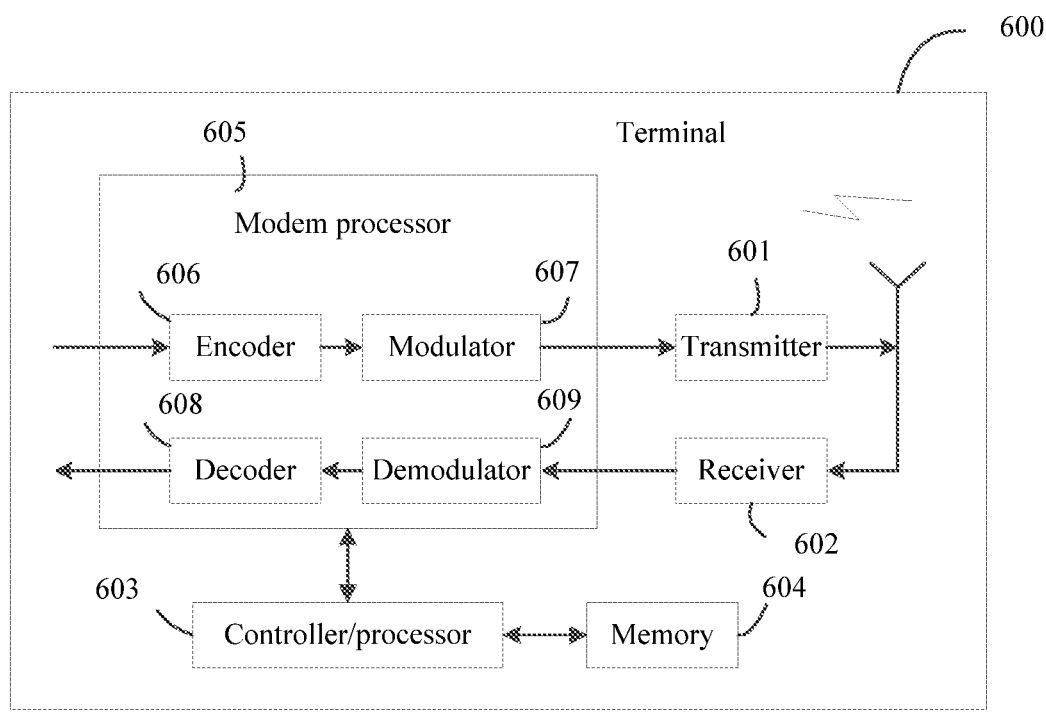
FIG. 6 is a schematic structural diagram of a terminal according to an embodiment of the present invention.

FIG. 6 is a simplified schematic diagram of a possible design structure of a terminal according to an embodiment of the present invention. The terminal 600 includes a transmitter 601, a receiver 602, and a processor 603. The processor 603 may alternatively be a controller, and is denoted as a "controller/processor 603" in FIG. 6. Optionally, the terminal 600 may further include a modem processor 605, and the modem processor 605 may include an encoder 606, a modulator 607, a decoder 608, and a demodulator 609.

In an example, the transmitter 601 adjusts (for example, performs digital-to-analog conversion, filtering, amplification, and up-conversion on) the output sample, and generates an uplink signal. The uplink signal is transmitted to the base station in the foregoing embodiments using an antenna. On a downlink, an antenna receives a downlink signal transmitted by the base station in the foregoing embodiments. The receiver 602 adjusts (for example, filters, amplifies, down-converts, and digitalizes) the signal received from the antenna and provides an input sample. In the modem processor 605, the encoder 606 receives service data and a signaling message that are to be sent on an uplink, and processes (for example, formats, encodes, and interleaves) the service data and the signaling message. The modulator 607 further processes (for example, performs symbol mapping and modulation on) encoded service data and an encoded signaling message, and provides an output sample. The demodulator 609 processes (for example, demodulates) the output sample and provides symbol estimation. The decoder 608 processes (for example, de-interleaves and decodes) the symbol estimation and provides the decoded data and the decoded signaling message that are sent to the terminal 600. The encoder 606, the modulator 607, the demodulator 609, and the decoder 608 may be implemented by the combined modem processor 605. These units perform processing according to a wireless access technology (for example, an access technology used by an LTE system and other evolved systems) used by a radio access network. It should be noted that when the terminal 600 does not include the modem processor 605, the foregoing functions of the modem processor 605 may be alternatively completed by the processor 603.

The processor 603 controls and manages an action of the terminal 600 and is configured to perform processing processes implemented by the terminal 600 in the foregoing embodiments of the present invention. For example, the processor 603 is further configured to perform processes 202 to 204 in FIG. 2, processes 302 to 304 in FIG. 3, and/or other processes in the technical solutions described in this application.

Further, the base station 600 may further include a memory 604, and the memory 604 is configured to store program code and data used for the terminal 600.

The processor configured to perform functions of the foregoing base station or terminal in the embodiments of the present invention may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor can implement or execute various logical blocks, modules, and circuits that are described as examples with reference to the content disclosed in the embodiments of the present invention. Alternatively, the processor may be a combination implementing a computing function, for example, a combination that includes one or more microprocessors, or a combination of a DSP and a microprocessor.

Method or algorithm steps described with reference to the content disclosed in the embodiments of the present invention may be implemented using hardware, or may be implemented by a processor by executing a software instruction. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or a storage medium in any other form that is well known in the art. A storage medium used as an example is coupled to the processor, so that the processor can read information from the storage medium, and can write information into the storage medium. Certainly, the storage medium may be a constituent part of the processor. The processor and the storage medium may be located in an ASIC. In addition, the ASIC may be located in a base station or a terminal. Certainly, the processor and the storage medium may exist in the base station or the terminal as discrete components.

A person skilled in the art should be aware that in one or more of the foregoing examples, the functions described in the embodiments of the present invention may be implemented using hardware, software, firmware, or any combination thereof. When the functions are implemented by software, these functions may be stored in a computer-readable medium or transmitted as one or more instructions or code in the computer-readable medium. The computer-readable medium includes a computer storage medium and a communications medium, where the communications medium includes any medium that facilitates transmission of a computer program from one place to another. The storage medium may be any available medium accessible to a general-purpose or special-purpose computer.

In the foregoing specific implementations, the objectives, technical solutions, and beneficial effects of the present invention are described in more detail. It should be understood that the foregoing descriptions are merely specific implementations of the embodiments of the present invention, but are not intended to limit the protection scope of the embodiments of the present invention. Any modification, equivalent replacement, or improvement made based on the technical solutions of the embodiments of the present invention shall fall within the protection scope of the embodiments of the present invention.

What is claimed is:

1. A data transmission method, comprising:
sending, by a base station, a grouping instruction to a target terminal, wherein the grouping instruction is an on/off setting value, wherein the on/off setting value is set to an "on" setting value indicating that terminals in a cell in which the target terminal is located need to be grouped, wherein the terminals are grouped in a preset grouping manner into N groups, wherein totally or partially different resources are allocated to terminals in different groups of the N groups, wherein a resource corresponding to an $i^{th}$ group of the N groups is used by a terminal in the $i^{th}$ group in uplink non-scheduled transmission, N is an integer greater than 1, and i is a positive integer less than or equal to N; and receiving, by the base station, data that is sent by the target terminal using a target resource, wherein the target resource is a resource corresponding to a target group to which the target terminal belongs;
wherein the preset grouping manner comprises a beam-based grouping manner, and the method further comprises:
transmitting, by the base station, a plurality of beams in the cell in which the target terminal is located, wherein the plurality of beams is used to transmit multiple discovery signals, so that the target terminal determines, based on a reception status of the discovery signals, the target group to which the target terminal belongs, wherein different beams transmit different discovery signals.

2. The method according to claim 1, wherein the preset grouping manner comprises a path-loss-based grouping manner, and the method further comprises:
sending, by the base station, a downlink signal to the target terminal, so that the target terminal determines, based on signal quality of the downlink signal, the target group to which the target terminal belongs.

3. The method according to claim 1, further comprising:
sending, by the base station to the target terminal, at least one of the following: a manner parameter, a grouping parameter, or a resource parameter, wherein the manner parameter is used to indicate the preset grouping manner, wherein the resource parameter is used to indicate a resource corresponding to each of the N groups, and wherein,
when the preset grouping manner comprises a random grouping manner, the grouping parameter comprises one or both of the following: a total quantity N of the groups or an index of each of the N groups;
when the preset grouping manner comprises a path-loss-based grouping manner, the grouping parameter comprises one or both of the following: a signal quality measurement manner, or a signal quality range corresponding to each of the N groups; and
when the preset grouping manner comprises the beam-based grouping manner, the grouping parameter comprises one or both of the following: a correspondence between each of the N groups and a discovery signal transmitted on a beam, or an index of a beam in use.

4. The method according to claim 1, wherein after the receiving, by the base station, data that is sent by the target terminal using a target resource, the method further comprises:
obtaining, by the base station, at least one of the following information: an uplink traffic volume of the cell, a resource usage status of the cell, an uplink traffic volume corresponding to the $i^{th}$ group, a usage status of the resource corresponding to the $i^{th}$ group, log information reported by the terminal in the $i^{th}$ group, or a quantity of terminals in the $i^{th}$ group; and
based on the at least one of the information, adjusting, by the base station, the N groups or cancelling grouping of the N groups.

5. A data transmission method, comprising:
receiving, by a terminal, a grouping instruction from a base station, wherein the grouping instruction is an on/off setting value, wherein the on/off setting value is set to an "on" setting value indicating that terminals in a cell in which the terminal is located need to be grouped, wherein the terminals are grouped in a preset grouping manner into N groups, wherein totally or partially different resources are allocated to terminals in different groups of the N groups, wherein a resource corresponding to an $i^{th}$ group of the N groups is used by a terminal in the $i^{th}$ group in uplink non-scheduled transmission, N is an integer greater than 1, and i is a positive integer less than or equal to N;

determining, by the terminal based on the preset grouping manner, a target group to which the terminal belongs;

determining, by the terminal, a target resource from a resource corresponding to the target group; and sending, by the terminal, data to the base station using the target resource, wherein the preset grouping manner comprises a beam-based grouping manner, and the determining, by the terminal based on the preset grouping manner, a target group to which the terminal belongs comprises:

determining, by the terminal based on a reception status of multiple discovery signals, the target group to which the terminal belongs, wherein the multiple discovery signals are transmitted on a plurality of beams transmitted by the base station in the cell in which the terminal is located, wherein different beams transmit different discovery signals.

6. The method according to claim 5, wherein the preset grouping manner comprises a random grouping manner; and the determining, by the terminal based on the preset grouping manner, a target group to which the terminal belongs comprises:

randomly selecting, by the terminal, a group from the N groups, as the target group.

7. The method according to claim 5, wherein the preset grouping manner comprises a path-loss-based grouping manner; and the determining, by the terminal based on the preset grouping manner, a target group to which the terminal belongs comprises:

receiving, by the terminal, a downlink signal sent by the base station;

determining, by the terminal, a signal quality range to which signal quality of the downlink signal belongs; and determining, by the terminal, a group corresponding to the signal quality range, as the target group.

8. The method according to claim 5, further comprising:

further receiving, by the terminal from the base station, at least one of the following: a manner parameter, a grouping parameter, or a resource parameter, wherein the manner parameter is used to indicate the preset grouping manner, wherein the resource parameter is used to indicate a resource corresponding to each of the N groups, and wherein, when the preset grouping manner comprises a random grouping manner, the grouping parameter comprises one or both of the following: a total quantity N of the groups or an index of each of the N groups;

when the preset grouping manner comprises a path-loss-based grouping manner, the grouping parameter comprises one or both of the following: a signal quality measurement manner, or a signal quality range corresponding to each of the N groups; and when the preset grouping manner comprises the beam-based grouping manner, the grouping parameter comprises one or both of the following: a correspondence between each of the N groups and a discovery signal transmitted on a beam, or an index of a beam in use.

9. A base station, comprising:

a processor, a transmitter, and a receiver; and wherein the processor is configured to: send a grouping instruction to a target terminal by the transmitter, wherein the grouping instruction is an on/off setting value, wherein the on/off setting value is set to an "on" setting value indicating that terminals in a cell in which the target terminal is located need to be grouped, wherein the terminals are grouped in a preset grouping manner, into N groups, wherein totally or partially different resources are allocated to terminals in different groups of the N groups, wherein a resource corresponding to an $i^{th}$ group of the N groups is used by a terminal in the $i^{th}$ group in uplink non-scheduled transmission, N is an integer greater than 1, and i is a positive integer less than or equal to N; and receive, by the receiver, data that is sent by the target terminal using a target resource, wherein the target resource is a resource corresponding to a target group to which the target terminal belongs, wherein the preset grouping manner comprises a beam-based grouping manner, and the processor is further configured to:

transmit, by the transmitter, a plurality of beams in the cell in which the target terminal is located, wherein the plurality of beams is used to transmit multiple discovery signals, so that the target terminal determines, based on a reception status of the discovery signals, the target group to which the target terminal belongs, wherein different beams transmit different discovery signals.

10. The base station according to claim 9, wherein the preset grouping manner comprises a path-loss-based grouping manner, and the processor is further configured to send, by the transmitter, a downlink signal to the target terminal, so that the target terminal determines, based on signal quality of the downlink signal, the target group to which the target terminal belongs.

11. The base station according to claim 9, wherein the processor is further configured to send, to the target terminal by the transmitter, at least one of the following: a manner parameter, a grouping parameter, or a resource parameter, wherein the manner parameter is used to indicate the preset grouping manner, wherein the resource parameter is used to indicate a resource corresponding to each of the N groups, and wherein, when the preset grouping manner comprises a random grouping manner, the grouping parameter comprises one or both of the following: a total quantity N of the groups or an index of each of the N groups;

when the preset grouping manner comprises a path-loss-based grouping manner, the grouping parameter comprises one or both of the following: a signal quality measurement manner, or a signal quality range corresponding to each of the N groups; and when the preset grouping manner comprises the beam-based grouping manner, the grouping parameter comprises one or both of the following: a correspondence between each of the N groups and a discovery signal transmitted on a beam, or an index of a beam in use.

12. The base station according to claim 9, wherein the processor is further configured to: after receiving, by the receiver, the data that is sent by the target terminal using the target resource, obtain at least one of the following information: an uplink traffic volume of the cell, a resource usage status of the cell, an uplink traffic volume corresponding to the $i^{th}$ group, a usage status of the resource corresponding to the $i^{th}$ group, log information reported by the terminal in the $i^{th}$ group, or a quantity of terminals in the $i^{th}$ group; and based on the at least one of the information, adjust the N groups or cancel grouping of the N groups.

13. A terminal, comprising:
a processor, a receiver, and a transmitter; and
wherein the processor is configured to receive, by the receiver, a grouping instruction from a base station, wherein the grouping instruction is an on/off setting value, wherein the on/off setting value is set to an "on" setting value indicating that terminals in a cell in which the terminal is located need to be grouped, wherein the terminals are grouped in a preset grouping manner into N groups, wherein totally or partially different resources are allocated to terminals in different groups of the N groups, wherein a resource corresponding to an $i^{th}$ group of the N groups is used by a terminal in the $i^{th}$ group in uplink non-scheduled transmission, N is an integer greater than 1, and i is a positive integer less than or equal to N; determine, based on the preset grouping manner, a target group to which the terminal belongs; determine a target resource from a resource corresponding to the target group; and send, by the transmitter, data to the base station using the target resource, wherein the preset grouping manner comprises a beam-based grouping manner, and wherein the processor is further configured to
determine based on a reception status of multiple discovery signals, the target group to which the terminal belongs, wherein the multiple discovery signals are transmitted on a plurality of beams transmitted by the base station in the cell in which the terminal is located, wherein different beams transmit different discovery signals.

14. The terminal according to claim 13, wherein the preset grouping manner comprises a random grouping manner, and the processor is configured to randomly select a group from the N groups, as the target group.

15. The terminal according to claim 13, wherein the preset grouping manner comprises a path-loss-based grouping manner, and the processor is configured to: receive, by the receiver, a downlink signal sent by the base station; determine a signal quality range to which signal quality of the downlink signal belongs; and determine a group corresponding to the signal quality range, as the target group.

16. The terminal according to claim 13, wherein the processor is further configured to receive, from the base station by the receiver, at least one of the following: a manner parameter, a grouping parameter, or a resource parameter, wherein the manner parameter is used to indicate the preset grouping manner, wherein the resource parameter is used to indicate a resource corresponding to each of the N groups, and wherein, when the preset grouping manner comprises a random grouping manner, the grouping parameter comprises one or both of the following: a total quantity N of the groups or an index of each of the N groups;

when the preset grouping manner comprises a path-loss-based grouping manner, the grouping parameter comprises one or both of the following: a signal quality measurement manner, or a signal quality range corresponding to each of the N groups; and when the preset grouping manner comprises the beam-based grouping manner, the grouping parameter comprises one or both of the following: a correspondence between each of the N groups and a discovery signal transmitted on a beam, or an index of a beam in use.

* * * * *